Jan. 10, 1950　　　　S. R. WHITAKER　　　　2,494,113
TUBULAR AIR HEATING FURNACE
Filed Dec. 6, 1944　　　　　　　　　　　　2 Sheets-Sheet 1

INVENTOR.
SAMUEL R. WHITAKER
BY
Martin E. Anderson

Jan. 10, 1950     S. R. WHITAKER     2,494,113
TUBULAR AIR HEATING FURNACE
Filed Dec. 6, 1944     2 Sheets-Sheet 2
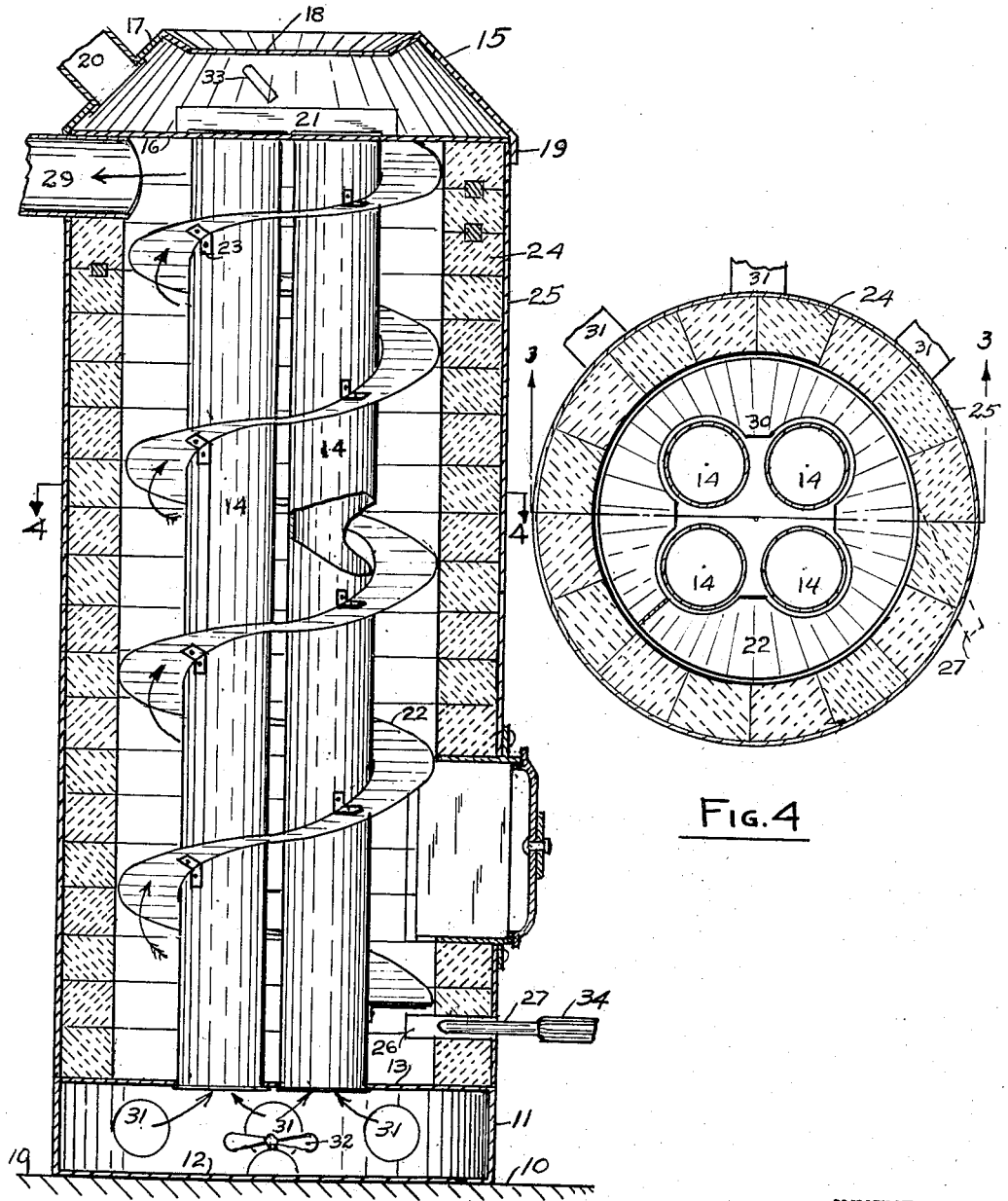
INVENTOR.
SAMUEL R. WHITAKER
BY
Martin E. Anderson Patented Jan. 10, 1950

2,494,113

UNITED STATES PATENT OFFICE 2,494,113

TUBULAR AIR HEATING FURNACE

Samuel R. Whitaker, Denver, Colo.

Application December 6, 1944, Serial No. 566,854

1 Claim. (Cl. 126—109)

This invention relates to improvements in furnaces and has reference more particularly to furnaces for dwellings of moderate size, although, of course, it can be made in any size desired.

In the heating of buildings, it is, of course, desirable to get as high efficiency as practicable and for this purpose the furnace should be so constructed that the heat units in the fuel are converted into heat for the building as efficiently as practicable.

It is the object of this invention to produce a furnace of a simple and substantial construction that shall be of such a design that the heating medium, either air or water, shall be in position to absorb the maximum amount of heat from the gases of combustion.

Another object of this invention is to produce a furnace in which the heat loss, due to radiation, shall be kept very low.

Another object of the invention is to produce a furnace of such design that it can be installed at a comparatively small cost.

A further object of the invention is to produce a furnace which shall be constructed of such material and in such a manner that it will have an exceptionally long life.

A further object of the invention is to produce a furnace that shall be dustproof so that whatever fuel is being utilized will not soil the furnace room by permitting gases or dust to escape.

A further object of this invention is to produce a furnace that shall have a small size in comparison to its capacity.

The above and other objects that may become apparent as this description proceeds are attained by means of a construction and an arrangement of parts that will now be described in detail, and for this purpose reference will be had to the accompanying drawings in which the invention has been illustrated in its preferred form, and in which:

Figure 3 is a diametrical section taken on line 3—3, Figure 4; and

Figure 4 is a transverse section taken on line 4—4, Figure 3.

Figures 1, 2:
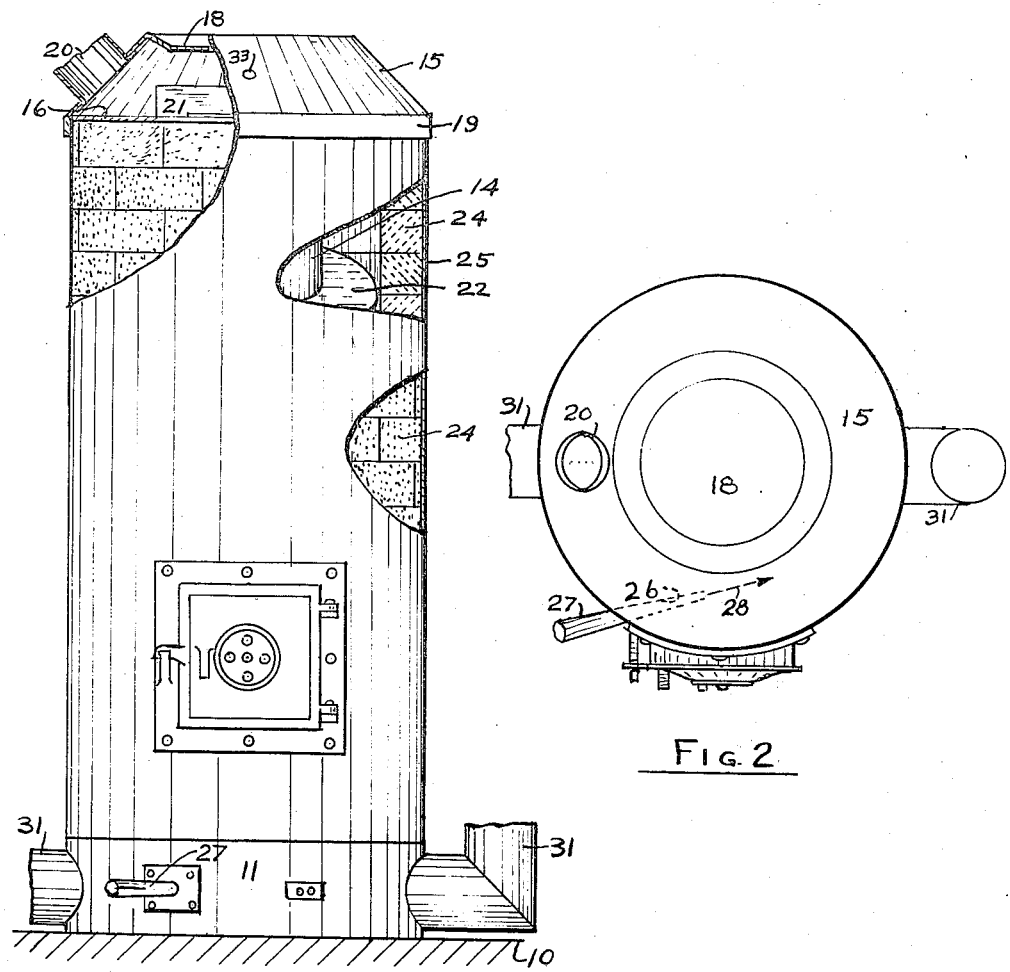
Figure 1 is a front elevation of a furnace constructed in accordance with this invention, portions thereof being broken away and other portions shown in section so as to better disclose the construction.
Figure 2 is a top plan view of the furnace shown in Figure 1.

In the drawing reference numeral 10 designates the floor or other support and reference numeral 11 designates an air intake manifold. In the present construction, the furnace will be shown and described as of circular cross section. It is to be understood, however, that any other cross section can be employed. The intake manifold 11 has a bottom 12 and a top plate 13. Four or more flues 14, have their lower ends welded or otherwise secured to the plate 13 and open into the intake manifold. The upper ends of the flues project into the hot air manifold 15. This manifold has a bottom plate 16 through which the flues extend and to which they are welded or otherwise secured. The hot air manifold can be constructed in the usual manner and has been shown as having a frusto conical wall 17, that is welded or otherwise secured to the bottom plate 16. A top 18 is secured to the upper edge of the frusto conical wall and is preferably depressed so as to retain a quantity of sand or other heat insulating material. A flange 19 extends downwardly from the plate 16. Reference numerals 20 designate hot air pipes that extend to the different rooms to be heated. A humidifier pan 21 can be positioned in the hot air manifold and has been indicated diagrammatically only. The hot air flues are surrounded by a spiral baffle plate 22 that is held in position by means of brackets 23, or other equivalent securing devices. The assembly that has just been described is enclosed in a cylindrical wall 24 that is built in place from fire brick. The separate bricks may be of any size desired and the number of bricks per circumference, as shown in Figure 4, is merely illustrative. The outer surface of the brick work may be covered with a coating 25 of heat insulating material, such as asbestos. Near the bottom is a fuel intake opening 26, which is inclined in a manner somewhat as shown in Figure 2. The nozzle 27, which introduces either gas or oil, is at such an angle that the fuel enters tangentially, and therefore it is given a motion in the direction of the arrow 28. From Figure 3 it will be seen that the opening 26 and the nozzle 27 are positioned beneath the lower spiral of the deflector plate. A flue 29 for the escape of the gases of combustion is positioned at the top of the brick work and underneath the upper spiral of the deflector. It will now be apparent that the gases of combustion will flow upwardly underneath the deflector and circulate about the hot air flues. This gives the gases a long path and brings them into intimate contact with the hot air flues. The flues are of comparatively small diameter and in a furnace of approximately 30 inches outside diameter, the flues have an inside diameter of about 6 inches. Since the construction is such that the gases of combustion travel around the inner surface of the brick work and in close contact with the flues, the heat transfer will take place readily. Although the deflector plate can be formed from a strip of material of uniform width throughout, it may be desirable at times to form the deflector strip in such a manner that it projects inwardly between the flues as indicated by reference numeral 30 in Figure 4.

Attention is called at this point to the fact that by the use of multiple flues positioned symmetrically about the center point of the furnace, a passage is provided for hot gases in the space between the flues. It is apparent that if the central space were closed the hot gases would contact substantially one-half of the outer surfaces of the tubes, whereas with the present construction heated gases can contact the entire outer surfaces. The cold air return pipes have been designated by reference numerals 31 and the air enters the intake manifold in the direction of the arrows in Figure 3. A fan 32 can be positioned in the intake manifold as shown in Figure 3 or in some equivalent position. The fan may be controlled by thermostats in the usual manner so as to be turned on or off in accordance with the temperature of the air in the hot air manifold. Such a thermostat has been designated by reference numeral 33 in Figure 3. Since such thermostatic control is old and well known, it will not be described in detail herein. The gas or liquid fuel is conducted to the nozzle through a pipe 34 that is provided with the ordinary control valves now in common use and which are operated in accordance with the temperature prevailing in the rooms to be heated, thermostats for this purpose being provided in the usual manner. In the present embodiment, four hot air flues have been shown, but any other number can be used.

Attention is called in particular to the fact that the stream of oil or gas fuel is introduced in a tangential or chordal direction as can be seen from the drawing. The fuel stream should not strike the flues directly. The idea is to cause the flame and gases of combustion to circulate helically and thereby surround the flues by a whirling stream of hot gases. The heat that is transmitted to the wall of the furnace will be reflected as a radiant heat. The centrifugal force developed by the gases in their helical movement tends to keep them in contact with the inner surface of the enclosing wall and thus a very small part, if any, of the gases of combustion will flow upwardly between the flues. The metal parts are preferably welded to each other and therefore the joints will be absolutely gas tight. If, for any reason, rivets are preferred to welding, such a method of construction can be substituted.

That part of the furnace comprising the two manifolds, the flues and the spiral plate 22 is manufactured and sold as a unit and are combined with the wall 24 at the place of installation.

Having described the invention what is claimed as new is:

A furnace comprising an intake manifold having a bottom, and a top plate, a plurality of tubular members extending upwardly from the manifold with their lower ends in communication with the interior thereof, a discharge manifold, the upper ends of the tubular members being in communication with the interior of the discharge manifold, an enclosing wall supported on the top plate of the intake manifold, extending between the manifolds and enclosing the tubular members, the tubular members being separated from the inner surface of the wall forming a space, a helical deflector plate positioned in said space and encircling the tubular members, forming a helical passage extending from near the bottom to the top of the furnace a discharge flue for gases of combustion adjacent the top of the enclosing wall, and means near the bottom of the furnace for directing a flame tangentially into the helical space for movement upwardly towards the discharge flue.

SAMUEL R. WHITAKER.

REFERENCES CITED

The following references are of record in the file of this patent:

UNITED STATES PATENTS

| Number | Name | Date |
|---|---|---|
| Re. 8,469 | Gridley | Oct. 29, 1878 |
| 496,750 | Schellhammer | May 2, 1893 |
| 698,170 | Birge | Apr. 22, 1902 |
| 1,748,303 | Miller | Feb. 25, 1930 |

FOREIGN PATENTS

| Number | Country | Date |
|---|---|---|
| 20,270 | Germany | Dec. 23, 1882 |
| 36,359 | Norway | Dec. 11, 1922 |